(12) United States Patent
Ahern et al.

(10) Patent No.: US 9,100,719 B2
(45) Date of Patent: Aug. 4, 2015

(54) ADVERTISING PROCESSING ENGINE SERVICE

(71) Applicant: Unicorn Media, Inc., Tempe, AZ (US)

(72) Inventors: Benjamin Lebrato Ahern, Tempe, AZ (US); David Morel, Tempe, AZ (US); Matthew A. Johnson, Tempe, AZ (US); Albert John McGowan, Phoenix, AZ (US)

(73) Assignee: Brightcove, Inc., Boston, MA (US)

( * ) Notice: Subject to any disclaimer, the term of this patent is extended or adjusted under 35 U.S.C. 154(b) by 0 days.

(21) Appl. No.: 13/748,791

(22) Filed: Jan. 24, 2013

(65) Prior Publication Data

US 2014/0157308 A1    Jun. 5, 2014

Related U.S. Application Data

(60) Provisional application No. 61/732,820, filed on Dec. 3, 2012.

(51) Int. Cl.
| | |
|---|---|
| H04N 7/10 | (2006.01) |
| H04N 21/81 | (2011.01) |
| H04L 29/06 | (2006.01) |
| H04N 21/2343 | (2011.01) |
| H04N 21/239 | (2011.01) |

(Continued)

(52) U.S. Cl.
CPC .......... *H04N 21/812* (2013.01); *H04L 65/4084* (2013.01); *H04L 65/605* (2013.01); *H04N 21/2393* (2013.01); *H04N 21/234309* (2013.01); *H04N 21/234363* (2013.01); *H04N 21/8455* (2013.01); *H04N 21/4431* (2013.01)

(58) Field of Classification Search
CPC ..................... H04N 21/26241; H04N 21/4547
USPC ...................................... 725/32–36
See application file for complete search history.

(56) References Cited

U.S. PATENT DOCUMENTS

2007/0240602 A1   10/2007   Dion et al.
2009/0030802 A1*   1/2009   Plotnick et al. .................. 705/14

(Continued)

FOREIGN PATENT DOCUMENTS

CN    102 685 550 A    9/2012
WO    2006/138251 A2   12/2006

OTHER PUBLICATIONS

International Search Report and Written Opinion, PCT/US2013/71306, mailed Feb. 10, 2014, 89 pages.

(Continued)

*Primary Examiner* — Junior Mendoza
(74) *Attorney, Agent, or Firm* — Kilpatrick Townsend & Stockton LLP

(57) ABSTRACT

Techniques described herein provide for an advertising processing engine service to act as an intermediary between client applications and advertising networks. The advertising processing engine service can provide an interface with which the client can interact, via an application programming interface (API) or directly through the use of a standardized language, thereby allowing client applications to receive advertisement data without the need to be customized to communicate with specific advertising networks. On the other hand, the advertising processing engine service can receive requests from clients and communicate these requests to advertising networks in the corresponding language and/or format they require.

22 Claims, 7 Drawing Sheets

(51) Int. Cl.
*H04N 21/845* (2011.01)
*H04N 21/443* (2011.01)

(56) References Cited

U.S. PATENT DOCUMENTS

| | | | | |
|---|---|---|---|---|
| 2010/0162301 | A1* | 6/2010 | Minnick | 725/34 |
| 2011/0023060 | A1* | 1/2011 | Dmitriev et al. | 725/34 |
| 2012/0124619 | A1* | 5/2012 | Rowe et al. | 725/32 |
| 2012/0136728 | A1* | 5/2012 | Hsiung et al. | 705/14.71 |
| 2012/0158527 | A1* | 6/2012 | Cannelongo et al. | 705/14.73 |
| 2012/0254367 | A1* | 10/2012 | McGowan | 709/219 |
| 2012/0259710 | A1* | 10/2012 | Peterson | 705/14.72 |
| 2012/0278837 | A1 | 11/2012 | Curtis et al. | |
| 2014/0143800 | A1* | 5/2014 | Arankalle et al. | 725/32 |

OTHER PUBLICATIONS

International Search Report and Written Opinion for PCT/US2013/071306, mailed Feb. 10, 2014, 12 pages.

* cited by examiner

| | 310 | 320 | 330 |
|---|---|---|---|
| | | Ad Network *a* | XSLT *A* |
| Customer 1 | | Ad Network *b* | XSLT *B* |
| | | ⋮ | ⋮ |
| | | Ad Network *c* | XSLT *C* |
| | | Ad Network *d* | XSLT *D* |
| Customer 2 | | Ad Network *e* | XSLT *E* |
| | | ⋮ | ⋮ |
| | | Ad Network *f* | XSLT *F* |
| ⋮ | | ⋮ | ⋮ |
| | | Ad Network *g* | XSLT *G* |
| Customer *n* | | Ad Network *h* | XSLT *H* |
| | | ⋮ | ⋮ |
| | | Ad Network *i* | XSLT *I* |

ADVERTISING PROCESSING ENGINE SERVICE

CROSS-REFERENCES TO RELATED APPLICATION

This application claims the benefit of U.S. Provisional Application No. 61/732,820, entitled "ADVERTISING PROCESSING ENGINE SERVICE," filed Dec. 3, 2012. The above-listed application is hereby incorporated by reference in its entirety for all purposes.

BACKGROUND OF THE INVENTION

The delivery of media over data networks such as the Internet is in high demand. This is due, in large part, because much of the media is ad supported. Advertising ("ad") networks can provide the advertisements needed to support the playback of the media. However, ad networks often provide advertisement data in a proprietary language and/or format. This forces developers to configure client applications, such as media player applications, to communicate with an advertising network in order to integrate advertisements and accompanying data into a media playback experience. If multiple advertising networks are to be used, the client application is separately configured to communicate with each advertising network. This process can be costly and time consuming.

BRIEF SUMMARY OF THE INVENTION

Techniques described herein provide for an advertising processing engine service to act as an intermediary between client applications and advertising networks. The advertising processing engine service can provide an interface with which the client can interact, via an application programming interface (API) or directly through the use of a standardized language, thereby allowing client applications to receive advertisement data without the need to be customized to communicate with specific advertising networks. On the other hand, the advertising processing engine service can receive requests from clients and communicate these requests to advertising networks in the corresponding language and/or format they require.

An example method for providing advertising data related to video content, via a data communications network, according to the disclosure, includes receiving, with a communications interface, a request for a first set of advertising data, and sending, via the communications interface, a request to obtain advertising data from at least a first advertisement network. The request to obtain advertising data from the first advertisement network is based on the request for the first set of advertising data. The method further includes receiving, with the communications interface, the first set of advertising data, transforming, with a processing unit, the first set of advertising data to conform to a certain format, and sending, via the communications interface, the first set of advertising data in the certain format. The method also includes receiving, with the communications interface, a request for a second set of advertising data, and sending, via the communications interface, a request to obtain advertising data from at least a second advertisement network. The request to obtain advertising data from the second advertisement network is based on the request for the second set of advertising data. Finally, the method includes receiving, with the communications interface, the second set of advertising data, transforming, with the processing unit, the second set of advertising data to conform to the certain format, and sending, via the communications interface, the second set of advertising data in the certain format.

An example server for providing advertising data related to video content, via a data communications network, includes a communications interface for communicating with the data communications network, a memory, and a processor communicatively coupled with the memory and the communications interface. The processor is configured to cause the server to receive, with the communications interface, a request for a first set of advertising data, and send, via the communications interface, a request to obtain advertising data from at least a first advertisement network. The request to obtain advertising data from the first advertisement network is based on the request for the first set of advertising data. The processor is further configured to cause the server to receive, with the communications interface, the first set of advertising data, transform the first set of advertising data to conform to a certain format, and send, via the communications interface, the first set of advertising data in the certain format. The processor is also configured to cause the server to receive, with the communications interface, a request for a second set of advertising data, and send, via the communications interface, a request to obtain advertising data from at least a second advertisement network. The request to obtain advertising data from the second advertisement network is based on the request for the second set of advertising data. The processor is further configured to cause the server to receive, with the communications interface, the second set of advertising data, transform the second set of advertising data to conform to the certain format, and send, via the communications interface, the second set of advertising data in the certain format.

An example non-transitory computer-readable medium having instructions imbedded thereon for providing advertising data related to video content, via a data communications network, includes instructions for receiving a request for a first set of advertising data, and sending a request to obtain advertising data from at least a first advertisement network. The request to obtain advertising data from the first advertisement network is based on the request for the first set of advertising data. The non-transitory computer-readable medium further includes instructions for receiving the first set of advertising data, transforming the first set of advertising data to conform to a certain format, and sending the first set of advertising data in the certain format. The non-transitory computer-readable medium also includes instructions for receiving a request for a second set of advertising data, and sending a request to obtain advertising data from at least a second advertisement network. The request to obtain advertising data from the second advertisement network is based on the request for the second set of advertising data. The non-transitory computer-readable medium further includes instructions for receiving the second set of advertising data, transforming the second set of advertising data to conform to the certain format, and sending the second set of advertising data in the certain format.

Items and/or techniques described herein may provide one or more of the following capabilities, as well as other capabilities not mentioned. As indicated previously, techniques allow clients to make requests for advertisements or without having to conform to proprietary language and/or format of an advertising network. This enables media providers to receive advertisement data from multiple advertising networks, including advertisement networks they would not have been able to interact with previously, given the time and costs it would have otherwise involved. These and other embodiments, along with many of its advantages and features, are described in more detail in conjunction with the text below and attached figures.

BRIEF DESCRIPTION OF THE DRAWINGS

The present disclosure is described in conjunction with the appended figures:

FIG. 3 is a simplified representation of and embodiment of data that can enable enabling the APES to provide requests in a format of the corresponding ad network(s) and/or adjust the data from the ad network(s) to conform to a standardized format.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The terms "ad" and "advertisement," including alternate forms thereof, refer to marketing content distinct from user-requested media content. Although, the techniques described herein discuss obtaining and providing advertising data, they also can be applied to data for content other than advertising. Furthermore, although techniques described herein are often provided in the context of video streaming, they can be applied to other forms of media content as well. A person of ordinary skill in the art will recognize many alternate applications.

The increased availability of media content over data communications networks such as the Internet has mirrored the increased bandwidth for these networks. Because media has recently taken a more prominent role in data communications, the distribution of media and the data associated with such distribution has become increasingly important, particularly to media content providers. Much of this media is ad-supported, allowing media content providers to receive advertising revenue from media content, while often allowing end users to consume the media content free of charge.

Figure 1:
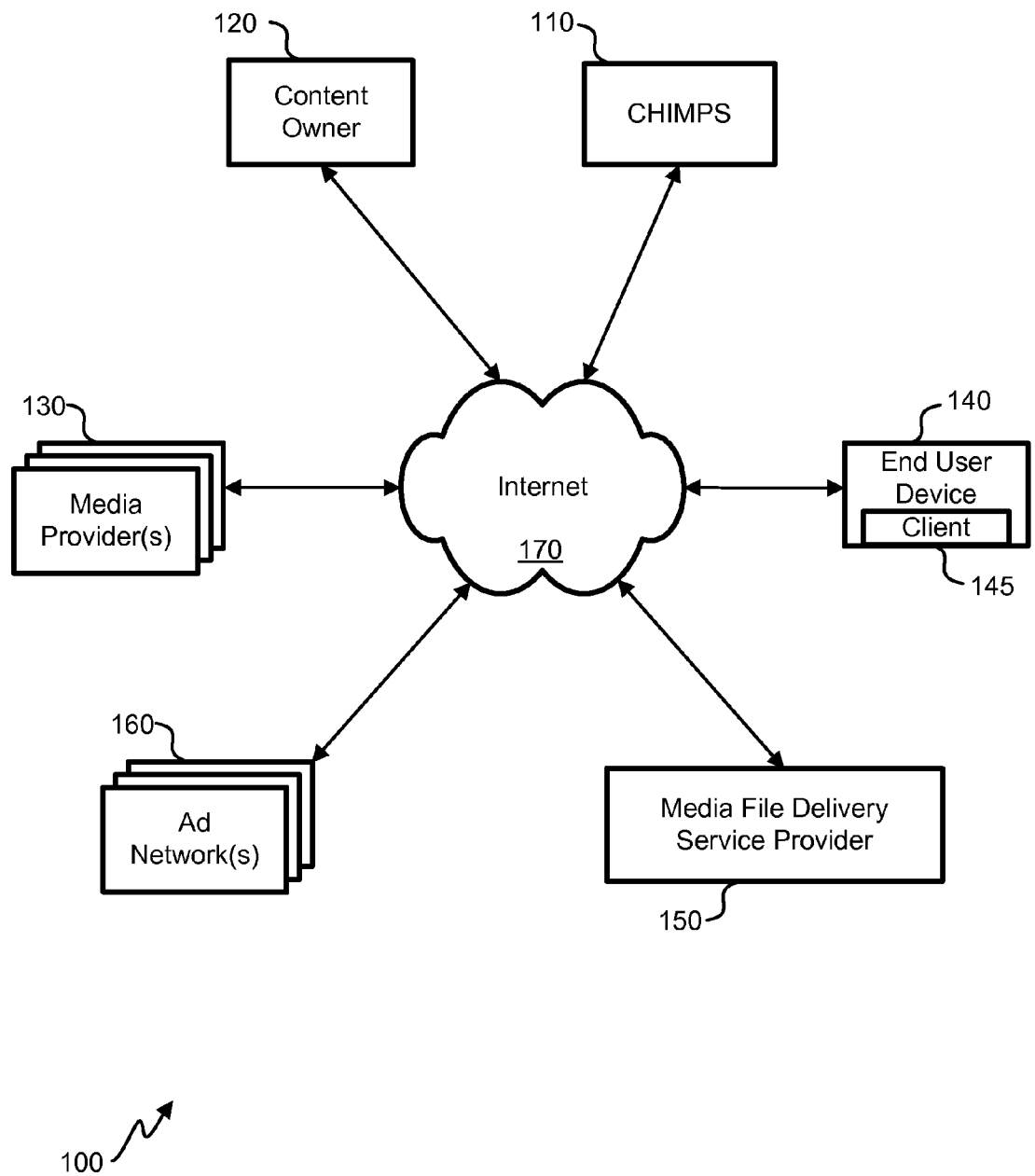
FIG. 1 is a block diagram illustrating a media servicing system, according to one embodiment of the present invention.

Advertisements are often stored and maintained separate from the primary media content. The distribution of ad-supported media via the Internet can therefore involve a variety of entities. FIG. 1 is a block diagram illustrating a media servicing system 100, according to some embodiments of the present invention. The system may deliver media content to a client 145, executed by an end user device 140 providing media playback to an end user. The client 145 can be, for example, a media player, browser, or other application adapted to request and/or play media files. The media content can be provided via a network such as the Internet 170 and/or other data communications networks, such as a distribution network for television content. The end user device 140 can be one of any number of devices configured to receive media over the Internet 170, such as a mobile phone, tablet, personal computer, portable media device, set-top box, video game system, etc. Although only one client 145 and one end user device 140 are shown in FIG. 1, it will be understood that the media servicing system 100 can provide media to many (hundreds, thousands, millions, etc.) of clients 145 on many (hundreds, thousands, millions, etc.) of end user devices 140.

A media file provided by one or more media providers 130 can be processed and indexed by cloud-hosted integrated multi-node pipelining system (CHIMPS) 110. The media file may be stored on media file delivery service provider (MFDSP) 150, such as a content delivery network, media streaming service provider, cloud data services provider, or other third-party media file delivery service provider. Additionally or alternatively, the CHIMPS 110 may also be adapted to store the media file.

The CHIMPS 110 can further manage the processing and syndication of media received from the media provider(s) 130. For example, the CHIMPS 110 can provide transcoding and other services to enable media provided by the media provider(s) to be distributed in a variety of formats to a variety of different device types in a variety of locations. Furthermore, the CHIMPS 110 provide feedback to the media provider(s) 130 regarding the media's syndication, including user behavior during media playback. For example, the CHIMPS 110 can provide a media provider 130 with information indicating that end users tend to stop watching a video at a certain point in playback, or that users tended to follow links associated with certain advertisements displayed during playback. With this data, media provider(s) 130 can adjust factors such as media content, advertisement placement and content, etc., to increase revenue associated with the media content and provide the end user device 140 with a more desirable playback experience. Additionally or alternatively, the CHIMPS 110 can dynamically provide a customized playback experience on the end user device 140 according to aspects of the context associated with the content at the time of the request, aspects of the content request itself, or both. It can be noted that although embodiments herein may utilize media files explicitly, other embodiments may utilized other forms of media assets, such as live streams, or other forms of media, such as dynamic web pages, and may incorporate multiple media elements, including players, user interface components, user controls and control components, images, and other media content, objects, or types. Additionally, it can be noted that various functions, operations, processes, or other aspects that are described in this example, and other examples, as being performed by or attributable to the CHIMPS 110 can be performed by another system operating in conjunction with the CHIMPS 110, loosely or tightly synchronized with the CHIMPS 110, or independently; for example, collecting data from other digital services to be combined and reported with data collected by the CHIMPS 110 can, in some implementations, be performed by a system other than the CHIMPS 110. Additional detail regarding the functionality of the CHIMPS 110 can be found in in U.S. patent application Ser. No. 13/624,029, entitled "Dynamic Chunking for Delivery Instances," which is incorporated by reference herein in its entirety.

A content owner 120 can utilize one or more media provider(s) 130 to distribute media content owned by the content owner 120. For example, a content owner 120 could be a movie studio that licenses distribution of certain media through various content providers 130 such as television networks, Internet media streaming websites and other on-demand media providers, media conglomerates, and the like. In some configurations, the content owner 120 also can operate as a media provider 130.

The content owner 120 and/or media provider(s) 130 can enter into an agreement with one or more ad network(s) 160 to provide advertisements to numerous clients 145 on numerous end user devices 140. In this manner, the ad network(s) 160 allow companies to show advertisements to end users viewing the media content from the media provider(s) 130. Because ad network(s) 160 can maintain advertisements and/or advertisement data separate from media content, the advertisements can be updated and subject to business rules such that, two users viewing the same media content at different times and/or in different locations may see different advertisements.

Different ad networks 160 often provide advertisement data to a client 145 in a proprietary language and/or format. Because it can be costly and time consuming to develop a client 145 using an SDK of a particular ad network 160, media provider(s) 130 and/or other entities that create clients 145 for media playback find it difficult to access advertisements from other ad networks 160. Furthermore, clients 145 may need to be updated whenever the ad network 160 for which the client was programmed makes any adjustments in its proprietary language and/or format. Some clients may allow for plugins to be utilized by an existing client 145 to communicate with different ad networks 160. However, it can still be time consuming and costly to separately integrate each of these plugins into a client 145. Problematically, many ad networks 160 are unable to fulfill the needs of a media provider 130 on their own. Thus, many media provider(s) and/or other entities that create clients 145 for media playback are forced to adapt their clients 145 to communicate with multiple ad networks 160 to fill up the allotted time slots for advertisements.

Figure 2A:
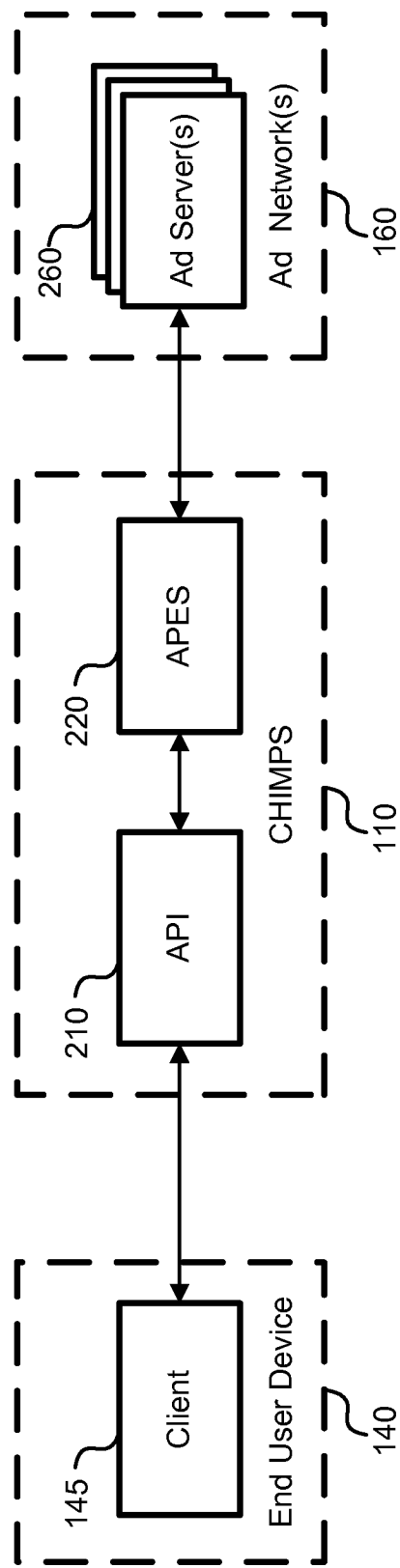
FIGS. 2A-2B are simplified block diagrams illustrating embodiments of systems utilizing an advertising processing engine service (APES).

Techniques provided herein utilize an Advertising Processing Engine Service (APES) to avoid problems that arise from this direct communication between ad network 160 and client 145. FIG. 2A is a simplified block diagram illustrating a system 200-1 utilizing an APES 220, according to a first embodiment. The system 200-1 can comprise a client 145, application programming interface (API) 210, APES 220, and one or more ad servers 260. As shown, these components can be incorporated into larger systems, such as the end user device 140, CHIMPS 110, and/or advertising network(s) 160 as shown in FIG. 1. In other embodiments, however, the APES 220, API 210, and/or other components may be incorporated differently into a larger system and/or may be stand-alone components. Furthermore, other embodiments may combine, separate, add, omit, substitute, and/or modify components of the system 200-1, while providing the same overall functionality as described herein.

The client 145 can interface with the API 210 to retrieve media and/or advertisement data, as well as access any other services of the CHIMPS 110. Accordingly, the client 145 need only be programmed for the routines, data structures, object classes, variables, etc. of the API 210, without being specially tailored to accommodate interaction with a particular ad network 160.

The API 210, in turn, can determine whether advertisements are needed in response to a request from the client 145. If so, the API 210 can determine the number of advertisements needed (ad count), duration of each, and other data to provide in a call to the APES 220, such as metadata for the requested media item, information from the client, custom parameters for client configuration, and the like.

The APES 220 can, using information from the request along with business rules for processing the request, determine which ad network(s) 160 are to be used with which time slots. It can then make the call(s) to one or more ad server(s) 260 of the ad network(s) 160 involved, requesting the relevant advertisement data for each advertisement needed. Importantly, the APES 220 can make the call(s) using the format required by each of the ad network(s) 160, passing along information that the ad network(s) 160 might need to provide the proper advertisements (for example, in accordance with agreements between the ad network(s) 160 and media provider(s) 130). Such information could include, for example, geographical data related to the location of the client 145, data (title, duration, genre, etc.) regarding the media content requested by the client, and the like.

In response to the request from the APES 220, the ad server(s) provide advertisement data for use in the playback of the media content. The advertisement data can include information enabling the advertisements to be incorporated into the playback of the media content, such as a URL of the advertisement, one or more accompanying tracking URLs, and other information. The CHIMPS 110 and/or other systems can utilize the advertisement data to seamlessly incorporate advertisements into a video stream provided to a client 145 using dynamic chunking and indexing processes, which are disclosed in U.S. Pat. No. 8,301,733 entitled "Dynamic Chunking for Delivery Instances" and U.S. Pat. No. 8,145,782, entitled "Dynamic Chunking For Media Streaming," both of which are incorporated by reference herein in their entirety.

In addition to providing advertisement data for playing video advertisements, an ad network 160 can provide information to a client 145 to enable the client 145 to add or alter interactive features. For example, additional information, such as a URL, can be passed to a client 145 to provide a "click through" URL that allows a user to click or otherwise select the video advertisement to evoke web content related to the advertisement (e.g., a web page of the advertiser and/or advertised product). In another example, information can be provided to the client 145 causing the client 145 to hide or inactivate some or all of controls of media player application during playback of an advertisement.

Upon receiving advertisement data back from the ad network(s) 160, the APES can then reformat the data into a standard format for consumption by the API 210. For example, the APES 220 can create objects for the API 210 from the advertisement data and pass the objects to the API 210. The API 210 can then utilize the advertisement data to include along with any other data necessary (which may be provided by other components (not shown), internal or external, to the CHIMPS 110) to respond to the client's request for media content. Providing, for example, a one or more URL(s) of video content having the incorporated advertisement(s).

The API 210 can also provide interactive advertising information to the client 145, which may be provided by an ad network 160 as explained previously. Such information can include control information, URL(s) to companion content, and/or other information associated with an advertisement. This information can be provided, for example, in an XML document within the response provided by the API 210. The XML document can describe one or more advertisements inserted into a related video stream, allowing the client to synchronize the interactive functionality with the playback of the advertisement(s). For instance, the XML document can describe a time slot (e.g., starting point and duration) of one or more advertisements inserted into the video stream, and provide accompanying interactive information (e.g., one or more companion banners, click-through URL(s), etc.) associated with the one or more advertisements. This can enable the client not only to receive video content data (e.g., a URL) from the API enabling the client to provide a video playback experience, but further wrap this experience with additional metadata provided by the ad network.

Because the APES 220 acts as an intermediary between the client 145 and the ad network(s) 160, the client 145 does not need to be specially configured to communicate with particular ad networks 160. Instead, the client 145 need only be able to communicate with the API 210. Data required by the ad network(s) 160 to implement business rules can be provided using the routines and other features of the API 210. In this manner, not only does the APES 220 relieve client developers of the task of providing specific functionality for each ad network 160 to be used, but it also future-proofs the client from any changes made in the ad networks' communication requirements.

The system 200-1 further overcomes issues that can arise when an ad network 160 redirects a request to a different ad network 160. In general, ad networks 160 have an inventory of advertisements. Due to different business rules may apply to different advertisements (e.g., geographical constraints, time constraints, etc.), this inventory may run out in certain circumstances. For example, a particular company or advertising company may, as part of an advertising campaign, pay a first ad network for one million impressions for a given month. Once the million impressions are made, the first ad network is no longer permitted to show ads from that advertising campaign. If the first network 160 is otherwise unable to fulfill a request for advertisement data (e.g., provide an advertisement for a particular time slot), it may redirect the request to a second ad network 160 in accordance with an agreement between the first and second ad networks (typically sharing profits from fulfilling the request). If the second ad network 160 is also unable to fulfill the request, it may also redirect the request. This process can continue until the request is fulfilled or ultimately fails. If the request is finally fulfilled, the response can include data from each of the ad networks involved. And because each ad network may respond to advertisement requests in a proprietary manner, parsing the final response can involve complex and difficult logic. Unlike systems that would require a client 145 to execute this difficult logic, the system 200-1 parses the response before it ever reaches the client. Thus, the system 200-1 allows for server-side functionality to handle difficult issues arising from redirects, providing advertising data in a standardized format. Depending on desired functionality, advertising data can include an advertisement and/or a URL of an advertisement, one or more tracking URLs, information regarding interactive content (discussed in more detail below), and/or other information.

It can be noted that each of the components of the system 200-1 can implement different business rules to provide advertisement data that comports with the requests of media provider(s) 130, content owners 120, and/or other stakeholders. Moreover, the API 210 can pass along information, provided in a request from the client 145, to the APES 220 that may include contextual and/or other data to inform business rules executed by the APES 220. Similarly, the APES 220 may pass along information that may inform business rules executed by the ad network(s) 160. Such information can include information provided in the original request from the client 145, and/or subsequently added by another component. In some embodiments, the request from the client 145 can not only inform business rules, but also provide new business rules to be implemented by the API 210, APES 220, and/or ad network(s) 160. Furthermore, information may be passed to the ad network(s) 160 that is not utilized by the API 210 or APES 220.

Figure 2B:
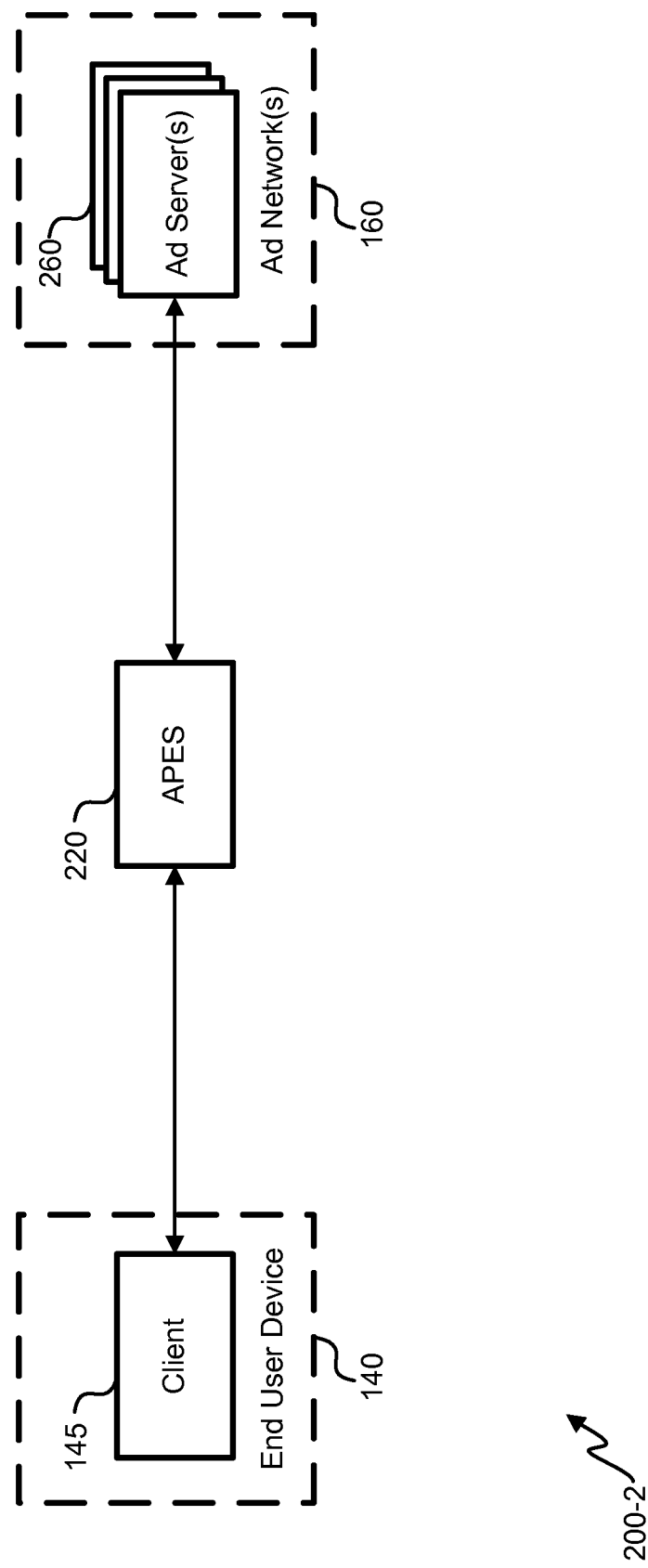

The functionality provided by the APES 220 can be utilized in systems that may not involve the CHIMPS 110. FIG. 2B is a simplified block diagram illustrating a system 200-2 utilizing an APES 220, according to a second embodiment. Here, the client 145, rather than the API 210 of FIG. 2A, determines that advertising data is needed and sends a request to the APES 220. For its part, the APES 220 of FIG. 2B can have the same functionality as the APES 220 of FIG. 2A, but rather than providing the advertisement data to an API 210, the APES 220 can provide the advertisement data directly to the client 145. In fact, the functionality of the APES 220 can be utilized in a variety of embodiments in which advertising data related to media content is desired. As described above, the APES 220 can be particularly beneficial when advertisement data from multiple ad networks 160 is desired.

FIG. 3 is a simplified representation of data 300 that can be stored at the APES 220, according to one embodiment, enabling the APES 220 to provide requests in a format of the corresponding ad network(s) and/or adjust the data from the ad network(s) to conform to a standardized format. Because each ad network 160 can have a proprietary language for communicating advertising data, which may vary depending on the customer (e.g., media provider 130, content owner 120, etc.) the APES 220 can have data 300 comprising conversion information for each customer and each ad network 160. Depending on desired functionality, the data 300 can be stored in a table or other data structure, with may be part of a larger database.

In the embodiment shown in FIG. 3, the data 300 includes a plurality of customers 310 that request advertisement data using the APES 220. The data 300 also includes the ad networks 320 used by each customer, as well as information 330 for transforming, or normalizing, data received from each ad network to a standardized format for each customer.

As shown in FIG. 3, information 330 for transforming the data from each ad network can comprise an Extensible Stylesheet Language Transformation (XSLT) for each ad network for each customer. According to some embodiments, the APES 220 may receive advertising data from an advertising network 160 in some proprietary language, often including Extensible Markup Language (XML). The APES 220 can then utilize the data 300 to determine the correct XSLT to be applied to transform the advertising data to a standardized format, such as Video Ad Serving Template (VAST) 2.0. The APES 220 can then provide the advertising data to the API 210, the client 145, and/or any other VAST 2.0-compliant service. Of course, in some embodiments, the APES 220 may utilize other versions of VAST, other formats, and/or other languages.

It can be noted that there may be an overlap in the ad networks used by customers. For example, ad network b for Customer 1 may be the same as ad network d for Customer 2.

That said, because transformation information can differ between customers, XSLT B and XSLT D corresponding to ad network b for Customer 1 and ad network d for Customer 2, respectively, may be different.

Furthermore, the data 300 can be generated and/or utilized in various ways. Because the ad network 160 associated with the request for advertising data may not be apparent from the request, the APES 220 can examine the response from the ad network 160 to determine which XSLT to use, based on the structure and/or content of the advertising data. In particular, some embodiments of the APES 220 may utilize XML Path Language (XPath), functions to search for one or more specific strings, and/or other tools to examine the response from the ad network 160. Additionally or alternatively, the APES 220 can determine the A record of a hostname used in the request sent to the ad network 160 to be able to match an IP with a particular ad network. The APES 220 can then treat future requests to the particular ad network similarly, under the assumption that responses from the particular ad network use a similar format.

Figure 4:
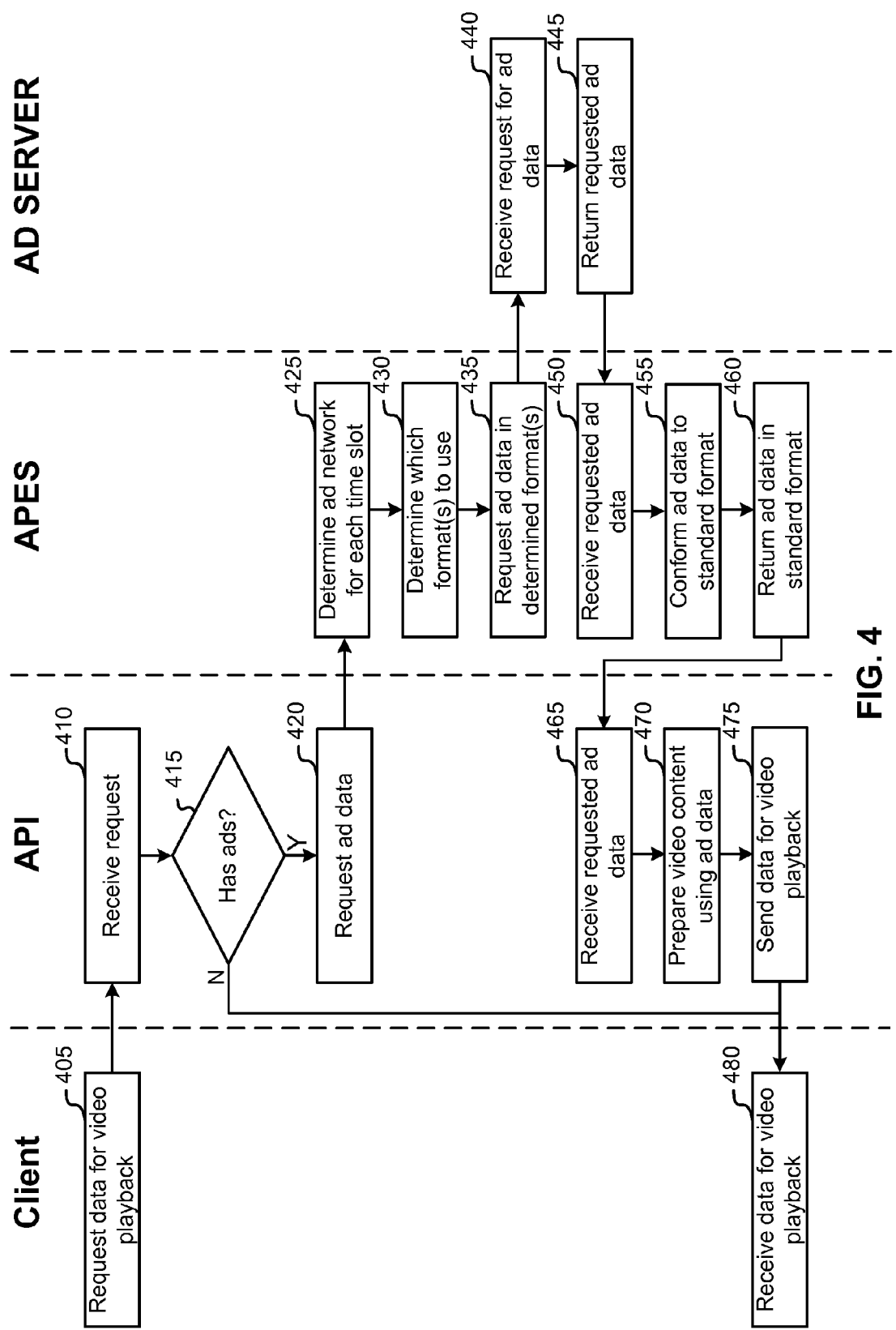
FIG. 4 is a swim-lane diagram illustrating how components described herein can interact to provide a client with video content, according to one embodiment.

FIG. 4 is a swim-lane diagram illustrating how various components described herein can interact to provide a client with data for video playback, according to one embodiment. The client 145, API 210, APES 220, and/or ad server 260 can be configured in the manner shown in FIG. 2A, for example. A person having ordinary skill in the art will recognize many alterations and modifications, which may be brought about when the APES 220 is utilized in configurations different from the configuration shown in FIG. 2A.

At block 405, the client 145 sends a request to the API 210 for data for video playback. Depending on desired functionality, this request can include one or more URLs. Furthermore, as explained previously, the request may include information that can be utilized by the API 210, APES 220, and/or ad server 260 to implement one or more business rules.

At block 410, the API 210 receives the request for data for video playback. The API 210 can then make a determination, at block 415, whether the request for data for video playback includes one or more advertisements. If not (e.g., the video is a included in a service paid for by the end user, media provider, and/or other entity), then the API 210 can simply provide the data for video playback to the client 145. However, if the API 210 determines video playback should include for one or more advertisements, then it can request ad data from the APES 220, at block 420.

As indicated earlier, the request from the API 210 can include information regarding the one or more advertisements. The API 210 can use on business rules (which may be provided to the API 210 by a related media provider 130 and/or content owner 120) to determine a number of advertisements needed for the requested data for video playback, the time slots for each advertisement (length and location in the video data), and the like. The API 210 can further determine information from the client 145, such as a globally unique identifier (GUID), and location information (e.g., internet provider, country, city, etc.), as well as custom parameters for a media player of the client 145, such as page information related to a URL.

At block 425, the APES 220 uses the request from the API 210 to determine the ad network 160 associated which each available time slot. This determination, too, can be made using on business rules provided by a related media provider 130 and/or content owner 120. The APES 220 also determines which format(s) to use, at block 430, when requesting the advertisements for each time slot. At block 435, the APES 220 requests the advertising data in the determined format(s).

Here, multiple requests may be sent out to multiple ad servers 260, which may be part of multiple ad networks 160, to fill all the time slots.

At block 440, the ad server 260 (which can be one of a plurality of ad servers 260 receiving requests from the APES 220) can receive the request for advertising data. The request can include data from the client (e.g., client identification information, location information, etc.), that can be used in determining business rules for providing the requested advertisement. For example, if the client is located in the United States, provide the advertisement in English, but if the client is in France, provide the advertisement in French. Once the proper advertisement data is generated and/or identified, at block 445, the ad server 260 returns the requested advertisement data.

At block 450, the APES 220 receives the requested advertising data. As described herein in relation to FIG. 3, the APES can determine the transformation information (e.g., XSLT) to use to transform the requested advertising data to a standard format. At block 455, the APES 220 uses the transformation information to conform the advertising data to the standard format. The APES 220 then returns the advertising data in the standard format at block 460.

At block 465, the requested advertising data is received by the API 210, which, at block 470, uses the advertising data to prepare the video content for playback. As indicated elsewhere herein, the API 210 can communicate with other systems to prepare the video content. Data for video playback is then sent at block 475, and received by the client at block 480. As indicated previously, the API 210 can also include data to provide additional interactivity of advertisements during the playback of the video content.

Other embodiments may utilize the APES 220 in a manner different than that shown in FIG. 4. For example, some embodiments may make on-the-fly requests for advertisement data during playback of data for video playback by the client 145. Embodiments may be utilized with progressive downloading, streaming of files and/or live content, which can include delivering an index file for streaming a plurality of media chunks and/or other streaming protocols.

Figure 5:
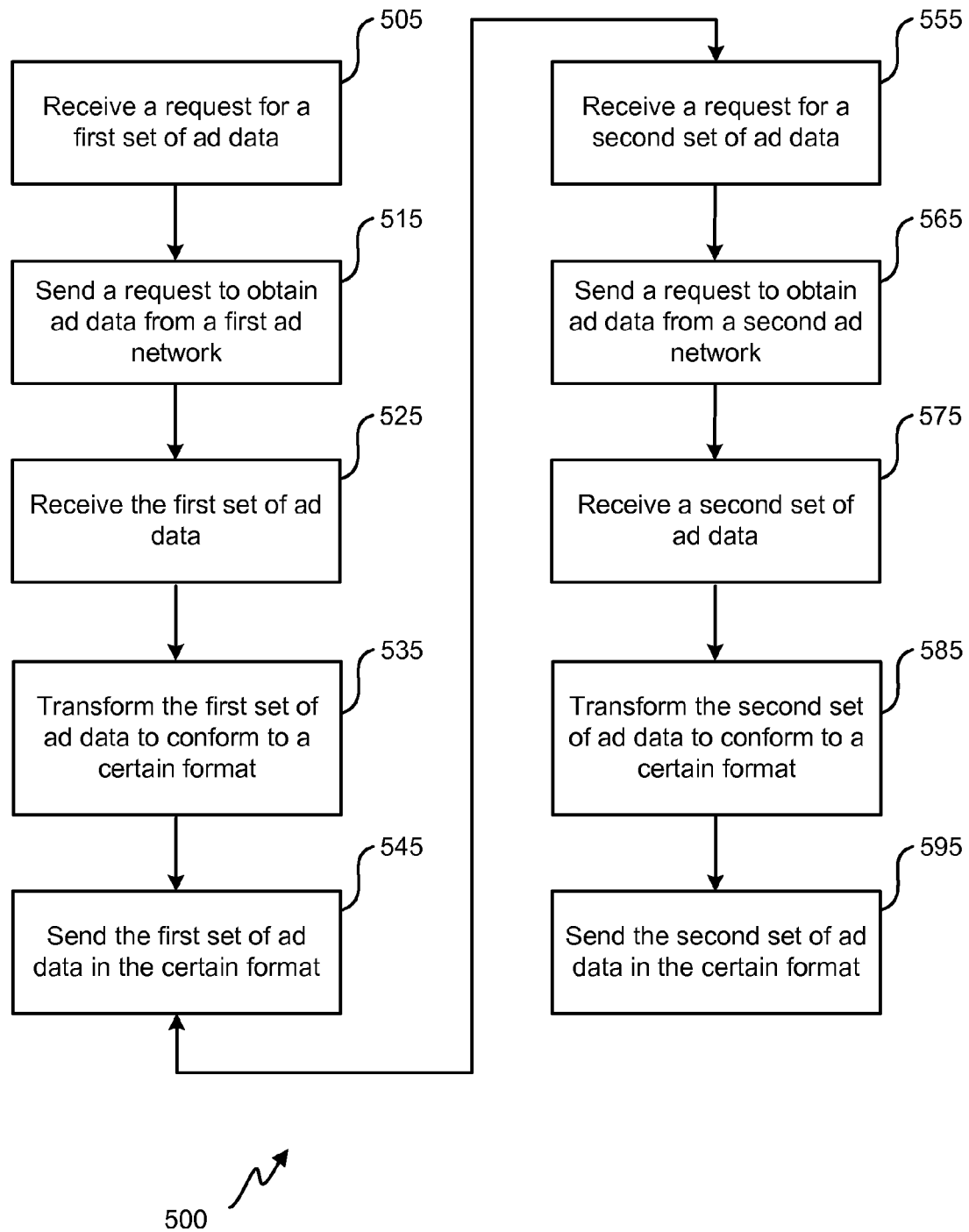
FIG. 5 is a simplified flow chart illustrating an embodiment of a process of providing advertising data, related to video content, via a data communications network.

FIG. 5 is a simplified flow chart illustrating a process 500 of providing advertising data, related to video content, via a data communications network, according to one embodiment. The process 500 can be implemented, for example, by the APES 220 described herein above. As with all other figures provided herein, FIG. 5 is provided as an example and is not limiting. Various blocks may be combined, separated, and/or otherwise modified, depending on desired functionality. Furthermore, different blocks may be executed by different components of a system and/or different systems. Such systems can include the computer system, described herein below with regard to FIG. 6.

At block 505, a request for a first set of ad data is received. The request can come from an API, such as the API 210 of FIG. 2A, a client, or other system requesting advertising data, depending on desired functionality. At block 515, a request to obtain ad data from a first ad network is sent. As indicated above, the request can be sent in a language and/or format of the ad network. Accordingly, the first ad network can be identified based on the request for the first set of advertising data. For example, multiple time slots may be identified for advertisements. One or more of the time slots may be identified and associated with the first ad network. Thus, the request to obtain advertising data can be created such that it conforms to a format and/or language associated with the first ad network.

At block 525, the first set of ad data is received. The ad data not only can include data for providing one or more advertisements during playback of a media item, but also accompanying content that can allow for interactivity of a media player application during playback of the one or more advertisements. As described above, transformation information can be utilized to, at block 535, adjust the first set of ad data to conform to a certain format. The transformation information can include, for example, an XSLT configured to transform the first set of ad data such that it conforms to a standard format, such as a version of VAST.

The first set of ad data is then sent in the certain format, at block 545. Depending on the implementation, the first set of ad data can be sent to an API and/or service before it is sent to a client. Additionally or alternatively, where the client is configured to receive ad data in the certain format, the first set of ad data can be sent directly to the client.

Blocks 555-595 echo blocks 505-545 but in regards to a request for a second set of ad data. The two requests of blocks 505 and 555 can be related to two different device types, such that the request for the first set of advertising data may be related to a device of a first device type, and the request for the second set of advertising data is related to a device of a second device type. Additionally or alternatively, the request for the first set of advertising data and the request for the second set of advertising data may both be related to the same video content. Depending on related business rules, different requests for the same video content may result in different advertisements. This can be due to, for example, differences in the time of the requests, location of the clients, client identifier, and the like.

Figure 6:
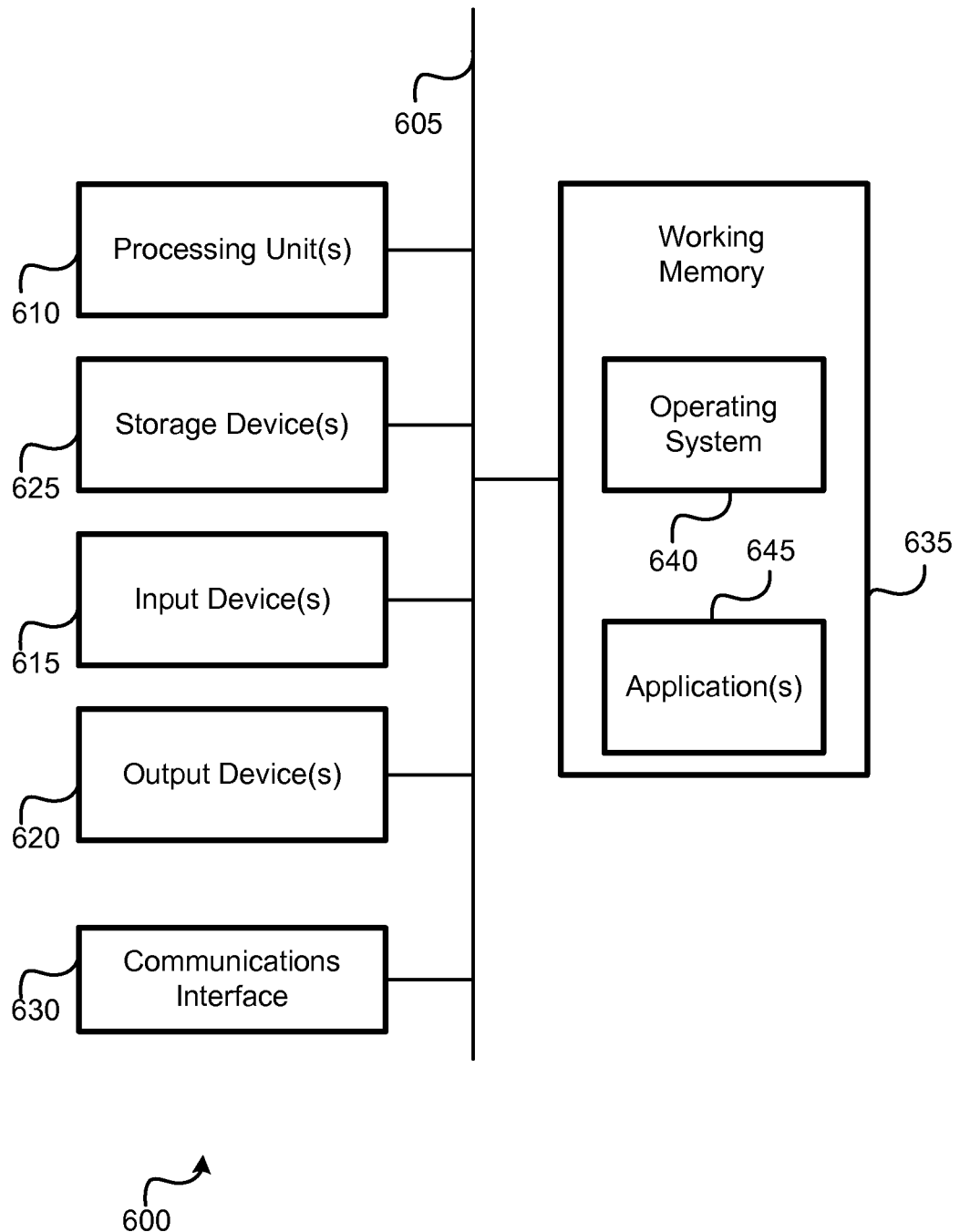
FIG. 6 is a block diagram of an embodiment of a computer system.

FIG. 6 illustrates an embodiment of a computer system 600, which may be configured to execute various components described herein using any combination of hardware and/or software. For example, the computer system 600 can be configured to execute the APES 220, API 210, and/or other components of the CHIMPS 110 and/or media servicing system 100, as described herein. FIG. 6 provides a schematic illustration of one embodiment of a computer system 600 that can perform the methods provided by various other embodiments, such as the method described in relation to FIG. 5. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner. In addition, it can be noted that components illustrated by FIG. 6 can be localized to a single device and/or distributed among various networked devices, which may be disposed at different physical locations.

The computer system 600 is shown comprising hardware elements that can be electrically coupled via a bus 605 (or may otherwise be in communication, as appropriate). The hardware elements may include processing unit(s) 610, which can include without limitation one or more general-purpose processors, one or more special-purpose processors (such as digital signal processing chips, graphics acceleration processors, and/or the like), and/or other processing structure, which can be configured to perform one or more of the methods described herein, including the method illustrated in FIG. 5, by, for example, executing commands stored in a memory. The computer system 600 also can include one or more input devices 615, which can include without limitation a mouse, a keyboard, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 can also include a communications interface 630, which can include wireless and wired communication technologies. Accordingly, the communications interface can include a modem, a network card (wireless or wired), an infrared communication device, a wireless communication device, and/or a chipset (such as a Bluetooth™ device, an IEEE 602.11 device, an IEEE 602.15.4 device, a WiFi device, a WiMax device, cellular communication facilities, UWB interface, etc.), and/or the like. The communications interface 630 can therefore permit the computer system 600 to to be exchanged with other devices and components of a network.

In many embodiments, the computer system 600 will further comprise a working memory 635, which can include a RAM or ROM device, as described above. Software elements, shown as being located within the working memory 635, can include an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 5, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a non-volatile computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for providing advertising data, related to video content, via a data communications network, the method comprising:
   receiving, with a communications interface, a request for a first set of advertising data;
   sending, via the communications interface, a request to obtain advertising data from at least a first advertisement network, wherein the request to obtain advertising data from the first advertisement network is based on the request for the first set of advertising data;

receiving, with the communications interface, the first set of advertising data in a first format, the first set of advertising data comprising first video content data and first metadata;

transforming, with a processing unit, at least the first metadata such that the first set of advertising data conforms with a certain format;

sending, via the communications interface the first set of advertising data in the certain format, wherein the first metadata includes an indication of a first set of one or more time slots corresponding to the placement, in video content of a video stream, of one or more advertisements associated with the first set of advertising data;

receiving, with the communications interface, a request for a second set of advertising data;

sending, via the communications interface a request to obtain advertising data from at least a second advertisement network, wherein the request to obtain advertising data from the second advertisement network is based on the request for the second set of advertising data;

receiving, with the communications interface, the second set of advertising data in a second format, the second set of advertising data comprising second video content data and second metadata;

transforming, with the processing unit, at least the second metadata such that the second set of advertising data conforms with the certain format; and sending, via the communications interface the second set of advertising data in the certain format, wherein the second metadata includes an indication of a second set of one or more time slots corresponding to the placement, in the video content of the video stream, of one or more advertisements associated with the second set of advertising data;

wherein the indication of the first set of one or more time slots and the indication of the second set of one or more time slots are sent to one or more end-user devices.

2. The method for providing advertising data via the data communications network as recited in claim 1, further comprising:

identifying the first advertisement network based on the request for the first set of advertising data;

creating the request to obtain advertising data from the first advertisement network such that it conforms to a format associated with the first advertisement network; and creating the request to obtain advertising data from the second advertisement network such that it conforms to a format associated with the second advertisement network.

3. The method for providing advertising data via the data communications network as recited in claim 2, further comprising:

identifying, based on the request for the first set of advertising data, one or more time slots for advertisements; and determining, for each of the one or more time slots, an advertising network associated with the time slot, based on one or more business rules.

4. The method for providing advertising data via the data communications network as recited in claim 2, wherein transforming at least the first metadata such that the first set of advertising data conforms with the certain format comprises using a first Extensible Stylesheet Language Transformation (XSLT) related to the first advertisement network.

5. The method for providing advertising data via the data communications network as recited in claim 4, wherein transforming at least the second metadata such that the second set of advertising data conforms with the certain format comprises using a second (XSLT) related to the second advertisement network.

6. The method for providing advertising data via the data communications network as recited in claim 1, wherein the request for the first set of advertising data and the request for the second set of advertising data are both related to the same video content.

7. The method for providing advertising data via the data communications network as recited in claim 1, wherein the certain format conforms to a version of Video Ad Serving Template (VAST).

8. The method for providing advertising data via the data communications network as recited in claim 1, wherein the request for the first set of advertising data is related to a device of a first device type, and the request for the second set of advertising data is related to a device of a second device type.

9. The method for providing advertising data via the data communications network as recited in claim 1, wherein either or both of the first set of advertising data or the second set of advertising data includes information for enabling interactive content during playback of an advertisement by a media player application.

10. The method for providing advertising data via the data communications network as recited in claim 1, wherein either or both of the first set of advertising data or the second set of advertising data includes information for disabling functionality of a media player application during playback of an advertisement.

11. A server for providing advertising data, related to video content, via a data communications network, the server comprising:

a communications interface for communicating with the data communications network;

a memory; and a processor communicatively coupled with the memory and the communications interface, the processor further configured to cause the server to:

receive, with the communications interface, a request for a first set of advertising data;

send, via the communications interface a request to obtain advertising data from at least a first advertisement network, wherein the request to obtain advertising data from the first advertisement network is based on the request for the first set of advertising data;

receive, with the communications interface, the first set of advertising data in a first format, the first set of advertising data comprising first video content data and first metadata;

transform at least the first metadata such that the first set of advertising data conforms with a certain format;

send, via the communications interface the first set of advertising data in the certain format, wherein the first metadata includes an indication of a first set of one or more time slots corresponding to the placement, in video content of a video stream, of one or more advertisements associated with the first set of advertising data;

receive, with the communications interface, a request for a second set of advertising data;

send, via the communications interface, a request to obtain advertising data from at least a second advertisement network, wherein the request to obtain advertising data from the second advertisement network is based on the request for the second set of advertising data;

receive, with the communications interface, the second set of advertising data in a second format, the second set of advertising data comprising second video content data and second metadata;

transform at least the second metadata such that the second set of advertising data conforms with the certain format; and send, via the communications interface the second set of advertising data in the certain format, wherein the second metadata includes an indication of a second set of one or more time slots corresponding to the placement, in the video content of the video stream, of one or more advertisements associated with the second set of advertising data;

wherein the processor is configured to cause the server to send the indication of the first set of one or more time slots and the indication of the second set of one or more time slots to one or more end-user devices.

12. The server for providing advertising data, related to video content, via a data communications network as recited in claim 11, wherein the processor is further configured to cause the server to:

identify the first advertisement network based on the request for the first set of advertising data;

create the request to obtain advertising data from the first advertisement network such that it conforms to a format associated with the first advertisement network; and create the request to obtain advertising data from the second advertisement network such that it conforms to a format associated with the second advertisement network.

13. The server for providing advertising data, related to video content, via a data communications network as recited in claim 12, wherein the processor is further configured to cause the server to:

identify, based on the request for the first set of advertising data, one or more time slots for advertisements; and determine, for each of the one or more time slots, an advertising network associated with the time slot based on one or more business rules.

14. The server for providing advertising data, related to video content, via a data communications network as recited in claim 12, wherein the processor is configured to cause the server to transform the at least the first metadata using an Extensible Stylesheet Language Transformation (XSLT) related to the first advertisement network.

15. The server for providing advertising data, related to video content, via a data communications network as recited in claim 11, wherein the processor is configured to cause the server to include, in either or both of the first set of advertising data or the second set of advertising data, information for enabling interactive content during playback of an advertisement by a media player application.

16. The server for providing advertising data, related to video content, via a data communications network as recited in claim 11, wherein the processor is configured to cause the server to include, in either or both of the first set of advertising data or the second set of advertising data, information for disabling functionality of a media player application during playback of an advertisement.

17. A non-transitory computer-readable medium having instructions imbedded thereon for providing advertising data, related to video content, via a data communications network, the computer-readable medium including instructions for:

receiving a request for a first set of advertising data;

sending a request to obtain advertising data from at least a first advertisement network, wherein the request to obtain advertising data from the first advertisement network is based on the request for the first set of advertising data;

receiving the first set of advertising data in a first format, the first set of advertising data comprising first video content data and first metadata;

transforming at least the first metadata such that the first set of advertising data conforms with a certain format;

sending the first set of advertising data in the certain format, wherein the first metadata includes an indication of a first set of one or more time slots corresponding to the placement, in video content of a video stream, of one or more advertisements associated with the first set of advertising data;

receiving a request for a second set of advertising data in a second format;

sending a request to obtain advertising data from at least a second advertisement network, wherein the request to obtain advertising data from the second advertisement network is based on the request for the second set of advertising data;

receiving the second set of advertising data in a second format, the second set of advertising data comprising second video content data and second metadata;

transforming at least the second metadata such that the second set of advertising data conforms with the certain format; and sending the second set of advertising data in the certain format, wherein the second metadata includes an indication of a second set of one or more time slots corresponding to the placement, in the video content of the video stream, of one or more advertisements associated with the second set of advertising data;

further including instructions for sending the indication of the first set of one or more time slots and the indication of the second set of one or more time slots to one or more end-user devices.

18. The non-transitory computer-readable medium having the instructions imbedded thereon for providing advertising data, related to video content, via a data communications network as recited in claim 17, further including instructions for:

identifying the first advertisement network based on the request for the first set of advertising data;

creating the request to obtain advertising data from the first advertisement network such that it conforms to a format associated with the first advertisement network; and creating the request to obtain advertising data from the second advertisement network such that it conforms to a format associated with the second advertisement network.

19. The non-transitory computer-readable medium having the instructions imbedded thereon for providing advertising data, related to video content, via a data communications network as recited in claim 18, further including instructions for:

identifying, based on the request for the first set of advertising data, one or more time slots for advertisements; and determine, for each of the one or more time slots, an advertising network associated with the time slot based on one or more business rules.

20. The non-transitory computer-readable medium having the instructions imbedded thereon for providing advertising data, related to video content, via a data communications network as recited in claim 18, wherein the instructions for transforming at least the first metadata include instructions for using an Extensible Stylesheet Language Transformation (XSLT) related to the first advertisement network.

21. The non-transitory computer-readable medium having the instructions imbedded thereon for providing advertising data, related to video content, via a data communications network as recited in claim 17, further having instructions for including, in either or both of the first set of advertising data or the second set of advertising data, information for enabling interactive content during playback of an advertisement by a media player application.

22. The non-transitory computer-readable medium having the instructions imbedded thereon for providing advertising data, related to video content, via a data communications network as recited in claim 17, further having instructions for including, in either or both of the first set of advertising data or the second set of advertising data, information for disabling functionality of a media player application during playback of an advertisement.

\* \* \* \* \*